(12) United States Patent
Juzswik et al.

(10) Patent No.: US 6,384,720 B1
(45) Date of Patent: May 7, 2002

(54) SYSTEM AND METHOD FOR SENSING AN OPERATING PARAMETER OF A VEHICLE TIRE

(75) Inventors: David Leonard Juzswik, Commerce; Carl Andrew Munch, Troy, both of MI (US); John Frederick Schimm, West Hollywood, CA (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/802,811

(22) Filed: Mar. 8, 2001

(51) Int. Cl.[7] .............................................. B60C 23/00
(52) U.S. Cl. ..................... 340/442; 340/447; 73/146.5; 73/146.8
(58) Field of Search ................................ 340/442, 445, 340/447; 73/146, 146.5, 146.8

(56) References Cited

U.S. PATENT DOCUMENTS

| | | | |
|---|---|---|---|
| 4,157,530 A | | 6/1979 | Merz |
| 5,231,391 A | | 7/1993 | Rigaux |
| 5,285,189 A | * | 2/1994 | Nowicki et al. ............ 340/447 |
| 5,463,374 A | | 10/1995 | Mendez et al. |
| 5,573,611 A | * | 11/1996 | Koch et al. .............. 152/152.1 |
| 5,585,554 A | * | 12/1996 | Handfield et al. ......... 73/146.5 |
| 5,600,301 A | | 2/1997 | Robinson, III |
| 5,717,135 A | | 2/1998 | Fiorletta et al. |
| 5,731,754 A | * | 3/1998 | Lee, Jr. et al. ............. 340/447 |
| 5,945,908 A | * | 8/1999 | Nowicki et al. ............ 340/447 |
| 5,960,844 A | * | 10/1999 | Hamaya ................. 152/152.1 |
| 5,963,128 A | | 10/1999 | McClelland |
| 6,064,936 A | | 5/2000 | Nakajima |
| 6,087,930 A | * | 7/2000 | Kulka et al. ............... 340/447 |

* cited by examiner

Primary Examiner—Edward Lefkowitz
(74) Attorney, Agent, or Firm—Tarolli, Sundheim, Covell, Tummino & Szabo L.L.P.

(57) ABSTRACT

A system (10) for monitoring an operating parameter of a tire (12) on a vehicle (14) includes an identification (72) connected to a vehicle rim (50) that conveys a rim identification code. A tire-based unit (20) senses an operating parameter of the tire (12) and provides a radio frequency signal (24) indicative of a sensed operating parameter of the tire and an identification code of the tire-based unit. A rim identification sensor (30) detects the identification (72) and provides a rim identification signal (32) indicative of the rim identification code and the position of the rim (50) on the vehicle (14). The system also includes electronics (40) for receiving the radio frequency signal (24) and the rim identification signal (32). The electronics (40) correlate the radio frequency signal (24) with the rim identification signal (32) to associate the radio frequency signal with the position on the vehicle (14) where the tire (12) is mounted.

20 Claims, 3 Drawing Sheets

SYSTEM AND METHOD FOR SENSING AN OPERATING PARAMETER OF A VEHICLE TIRE

TECHNICAL FIELD

The present invention relates to a system for providing information relating to a vehicle tire. More particularly, the present invention relates to a system and method for sensing an operating parameter of a tire and the position on the vehicle of the tire for which the operating parameter is sensed.

BACKGROUND OF THE INVENTION

It is known to provide a vehicle with a system for sensing an operating parameter of a vehicle tire in order to monitor the operating parameter while operating the vehicle. Such operating parameters include the inflation pressure and temperature of the tire. The known systems include sensors that are mounted to individual tires and/or rims of the vehicle and provide a wireless signal that includes data relating to the inflation pressure of the individual tire.

The sensors of the known systems may change position on the vehicle as the tires and/or rims are mounted at different positions on the vehicle, e.g., when the tires are replaced or rotated. The known systems require manual programming or calibration to allow the system to associate the sensors with their associated tire positions. Therefore, it is desirable to provide a system for sensing operating parameters of a vehicle tire that automatically associates the sensed operating parameter with the position of the tire from which the operating parameter is sensed.

SUMMARY OF THE INVENTION

In accordance with the present invention, a system for monitoring an operating parameter of a tire of a vehicle includes an identification adapted to be connected to a rim of the vehicle. The identification conveys a rim identification code. A tire-based unit senses an operating parameter of the tire and provides a radio frequency signal indicative of a sensed operating parameter of the tire and an identification code of the tire-based unit. A rim identification sensor detects the identification and provides a rim identification signal indicative of the rim identification code and the position of the tire on the vehicle.

The system also includes electronics for receiving the radio frequency signal and the rim identification signal. The electronics correlate the radio frequency signal with the rim identification signal and associate the radio frequency signal with the position on the vehicle where the tire is mounted.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
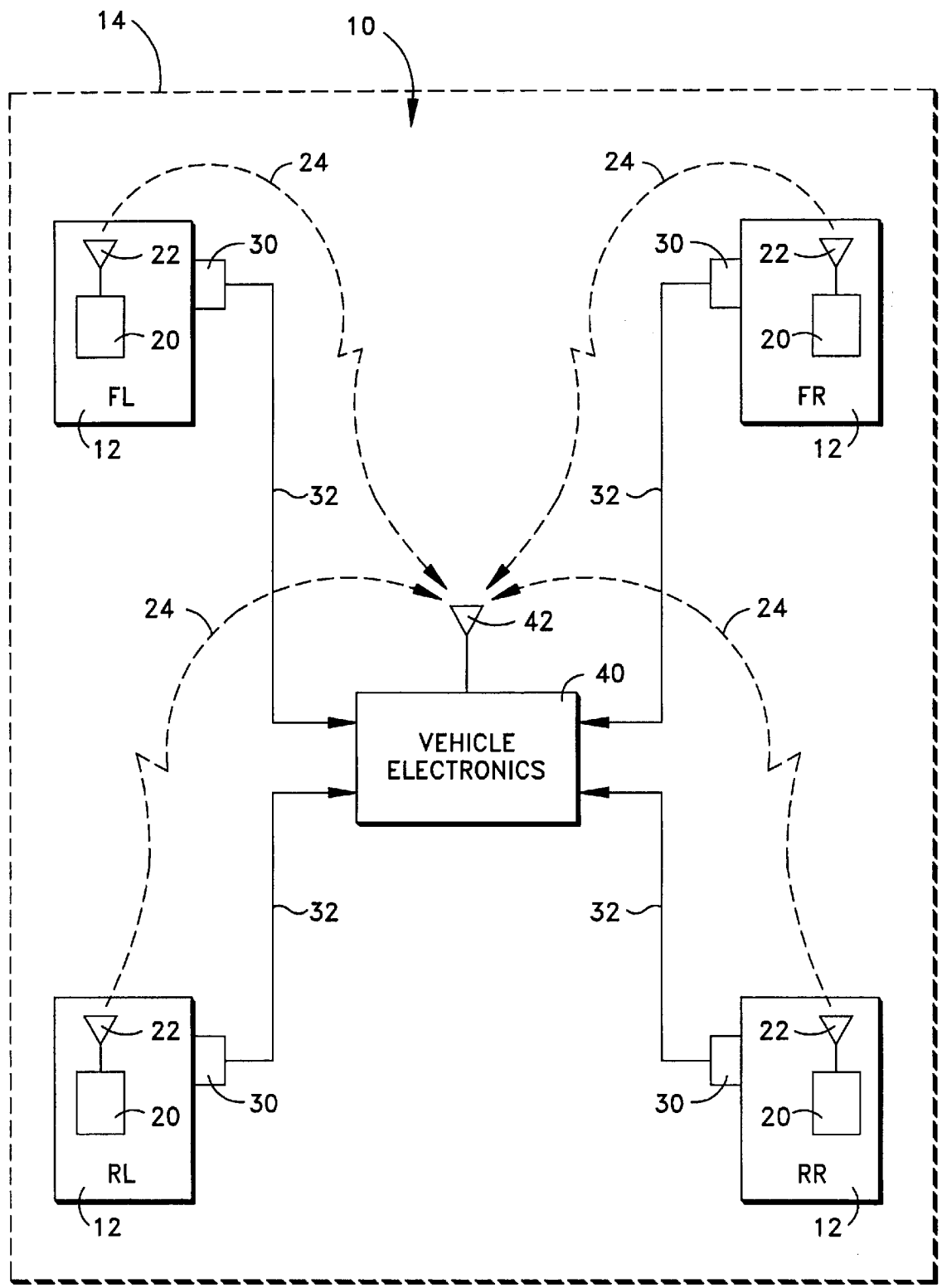
FIG. 1 is a schematic illustration of a system for monitoring an operating parameter of a vehicle tire in accordance with example embodiments of the present invention.

In accordance with a first example embodiment of the present invention, FIG. 1 illustrates a system 10 for monitoring an operating parameter of a tire 12 of a vehicle 14. In the embodiment illustrated in FIG. 1, the vehicle 14 includes four tires 12. The tires 12 are located at tire positions designated front-left (FL), front-right (FR), rear-left (RL) and rear-right (RR). It is to be appreciated, however, that the vehicle 14 could include more than four tires 12 or fewer than four tires.

The system 10 includes tire-based units 20 for sensing an operating parameter of the tires. A tire-based unit 20 is associated with each of the tires 12. Each tire-based unit 20 includes a transmitter with an antenna 22 for transmitting a radio frequency signal indicative of the operating parameter of the tire 12 sensed by the tire-based unit. Each tire-based unit 20 has a unique identification code that is included in every transmission of the radio frequency signal. The radio frequency signals are indicated generally by the dashed lines labeled 24 in FIG. 1.

The system 10 also includes rim identification sensors 30 for providing a rim identification signal. Each rim identification sensor 30 is associated with a predetermined tire position on the vehicle 14, i.e., FL, FR, RL, or RR. The rim identification signals are indicated generally by the solid lines labeled 32 in FIG. 1.

The tire-based units 20 provide the radio frequency signal 24 to vehicle electronics 40 of the system 10. The vehicle electronics 40 include an antenna 42 for receiving the radio frequency signals 24 from the tire-based units 20. The rim identification sensors 30 provide the rim identification signals 32 to the vehicle electronics 40. The rim identification sensors 30 may be hard-wired to the vehicle electronics 40, as illustrated by the solid lines in FIG. 1. In this instance, the rim identification sensors 30 are associated with the tire positions via the hard-wire connection. Alternatively, the rim identification sensors 30 could transmit the rim identification signals 32 via radio frequency signals (not shown). In this instance, the rim identification sensors may be associated with the tire positions by means such as transmitting each of the rim identification signals 32 at a unique frequency or by tagging the signals with a unique tire position code.

Figure 2:
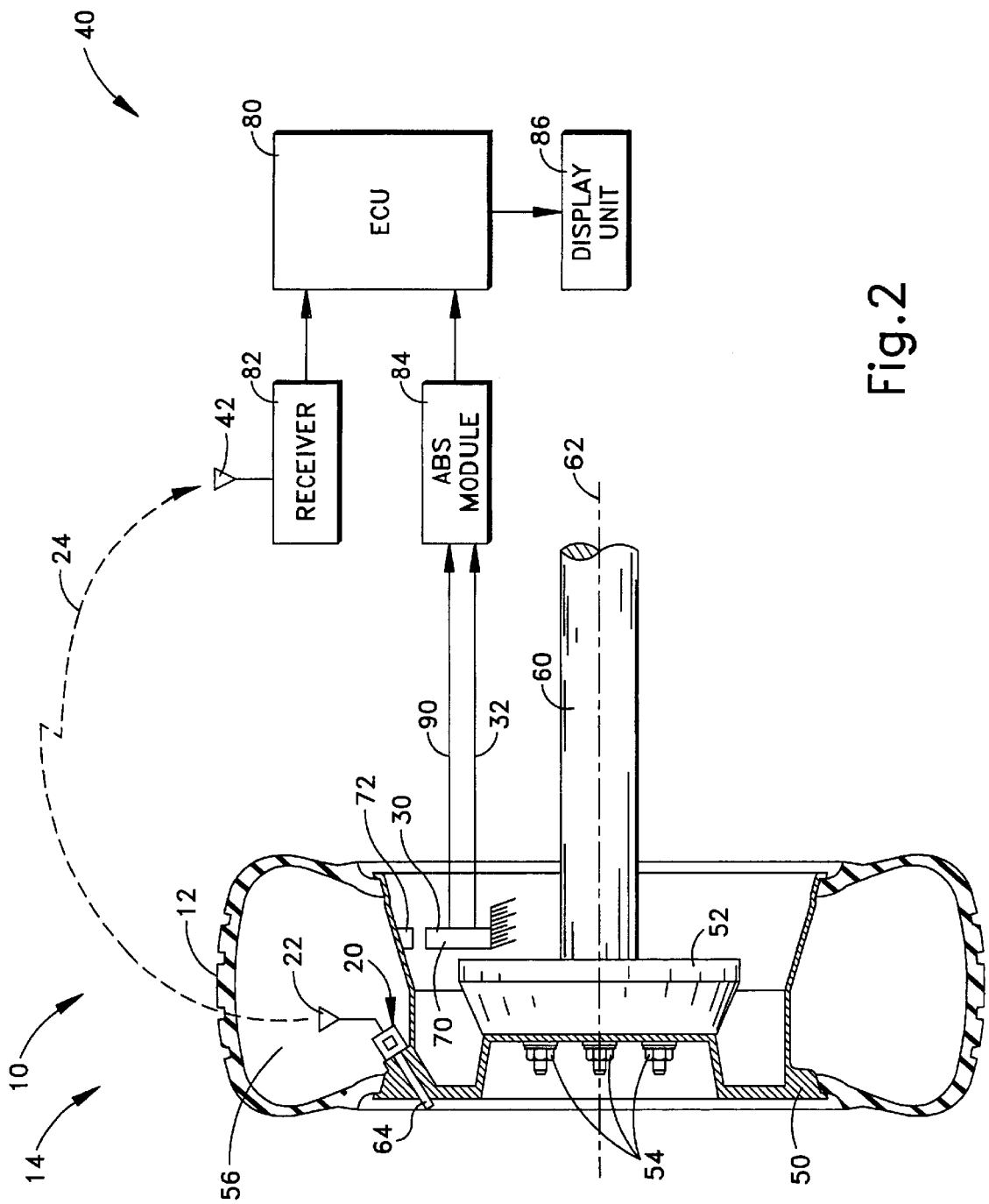
FIG. 2 is a schematic illustration of a portion of the system of FIG. 1, including portions of the vehicle structure, according to a first example embodiment of the present invention.

FIG. 2 illustrates the configuration of the system 10 relative to a single tire 12 of the vehicle 14. It should be understood that the configuration of the system 10 with respect to all of the vehicle tires 12 is generally identical. Therefore, FIG. 2 is representative the configuration of the system 10 with respect to all of the tires 12.

As illustrated in FIG. 2, each tire 12 is mounted on a rim 50, which is mounted to a wheel hub 52 via fastening means 54. The wheel hub 52 is connected to an axle 60 and rotatable with the axle about an axis 62. The rim 50 and, thus, the tire 12 are rotatable with the wheel hub 52 about the axis 62. The rim 50 and the tire 12 help define a tire cavity 56 that is inflated with an inflation fluid, such as air, to a desired inflation pressure.

The tire-based unit 20 is mounted to the rim 50 within the tire cavity 56. In the embodiment illustrated in FIG. 2, the tire-based unit 20 is included as a portion of a conventional tire inflation valve 64. It is to be appreciated, however, that the tire-based unit 20 may be separate from the inflation valve 64 and also may be mounted at some other location on the rim 50 within the tire cavity. As a further alternative, the tire-based unit 20 could also be mounted to the tire 12 within the tire cavity 56.

The tire-based unit 20 may be configured to sense a variety of operating conditions of the tire 12. For example, the tire-based unit 20 may include a pressure sensor for sensing inflation pressure of the tire 12. In this instance, the radio frequency signal 24 transmitted by the tire-based unit 20 would be indicative of the sensed inflation pressure and the identification code of the tire-based unit. Alternatively, the tire-based unit 20 may include a temperature sensor for sensing a temperature of the tire 12. In this instance, the radio frequency signal 24 transmitted by the tire-based unit 20 would be indicative of the sensed temperature and the identification code of the tire-based unit.

The rim identification sensor 30 is mounted to the vehicle 12 at a position adjacent the wheel hub 52 and the rim 50. The hub 52 and the rim 50, when rotated about the axis 62, are thus movable relative to the rim identification sensor 30. As illustrated in FIG. 2, the rim identification sensor 30 is incorporated as composes a portion of a speed sensor 70 of an anti-lock braking system (ABS). The speed sensor 70 is used to sense the rotational velocity of the wheel hub 52.

The combination of the rim identification sensor 30 with the ABS speed sensor 70 may be advantageous for several reasons. Combining the sensors 30 and 70 as one part reduces the required number of parts and thus may help reduce manufacturing time and cost. Also, existing hardware can be utilized to install the sensors 30 and 70 on the vehicle 14. Moreover, existing wiring schemes may be used or adapted to facilitate the use of the combined sensors 30 and 70.

A rim identification 72 is mounted on the rim 50 in a position such that the identification passes adjacent the rim identification sensor 30 as the rim rotates about the axis 62. The rim identification 72 comprises a plurality of magnetic elements (not shown) having polarities arranged in a predetermined pattern corresponding to a binary rim identification code. The rim identification sensor 30 includes a device for detecting magnetic fields, such as a Hall effect device, which reads the rim identification code as the rim passes by the sensor. The rim identification signal 32 provided by the rim identification sensor 30 thereby includes the rim identification code.

The vehicle electronics 40 include an electronic control unit (ECU) 80, a receiver 82, an anti-lock braking system (ABS) module 84, and a display unit 86. The receiver 82 receives the radio frequency signal 24 from the tire-based unit 20 via the antenna 42. The receiver 82 is operatively connected to the ECU 80 so as to convey the operating parameter of the tire 12 sensed by the tire-based unit 20, and the identification code of the tire-based unit, to the ECU.

The rim identification sensor 30 and the ABS speed sensor 70 are operatively connected to the ABS module 84 to provide the rim identification signal 32 and a wheel speed signal 90 to the ABS module. Although the signals 32 and 90 are illustrated separately by the solid lines in FIG. 2, it is to be appreciated that there may be alternative means by which to provide the signals 32 and 90 to the ABS module 84. For example, the sensors 30 and 70 may be connected to the ABS module 84 individually, such as by separate wires or cables connected separately to the sensors and the ABS module. Alternatively, the sensors 30 and 70 may be connected to the ABS module 84 collectively, such as by a single wire or cable connected to the sensors and the ABS module. As a further alternative, the rim identification signal 32 and the wheel speed signal 90 could be packaged as a single signal provided to the ABS module 84 by a single wire or cable.

The ABS module 84 is operatively connected to the ECU 80 so as to convey the rim identification signal 32 to the ECU. Because the rim identification sensor 30 is associated with a predetermined tire position (LF, RF, RL, RR) on the vehicle 14, the ABS module 84 conveys the tire position associated with the rim identification signal 32 to the ECU 80. Thus, the ABS module 84 provides the ECU 80 with the rim identification code associated with each tire position on the vehicle 14.

It is to be appreciated that the ECU 80 may have a variety of configurations. For example, the ECU 80 may comprise a plurality of discrete circuits, circuit components, and a controller. The ECU 80 could have various alternative configurations that include combinations of digital and/or analog circuitry.

The ECU 80 includes memory that stores means for correlating the rim identification code with the identification code of the tire-based unit 20 from which the radio frequency signal 24 is transmitted. For example, the ECU 80 could store a look-up table that contains each of the rim identification codes and the identification code of the tire-based unit 20 associated with each rim identification code. Alternatively, the rim identification code and the identification code of the tire-based units 20 of any given rim could be identical or could have corresponding identical portions. In this instance, the ECU 80 could associate rim identification codes with the identification code of the tire-based unit 20 by matching the codes or corresponding portions thereof.

The ECU 80 associates the radio frequency signal 24 with a tire position on the vehicle 14. The ECU 80 thereby associates the operating parameter of the tire 12 with the specific tire position at which the operating parameter is sensed. The system 10 is thus operable to sense the operating parameter of the tire 12 and the position of the tire on the vehicle 14.

The ECU 80 is operatively connected to the display unit 86. The display unit 86 provides indication of the sensed operating parameters of the tires 12 and the position of the tires on the vehicle. Such indications may be in the form visual devices (e.g., display screens or indicator lights) and/or audible devices (e.g., buzzers or chimes). For example, the display unit 86 may display that the front-left tire has a low inflation pressure by sounding a buzzer, flashing an indicator light representative of the front-left tire position, and displaying a warning indicator signaling low pressure.

The system 10 acquires the sensed operating parameters of the tires 12 and automatically associates the sensed operating parameters with the position of the tires from which the operating parameter is sensed. Thus, there is no need to calibrate or otherwise re-program the system 10 to learn new tire positions when events such as tire replacement or rotation take place.

Figure 3:
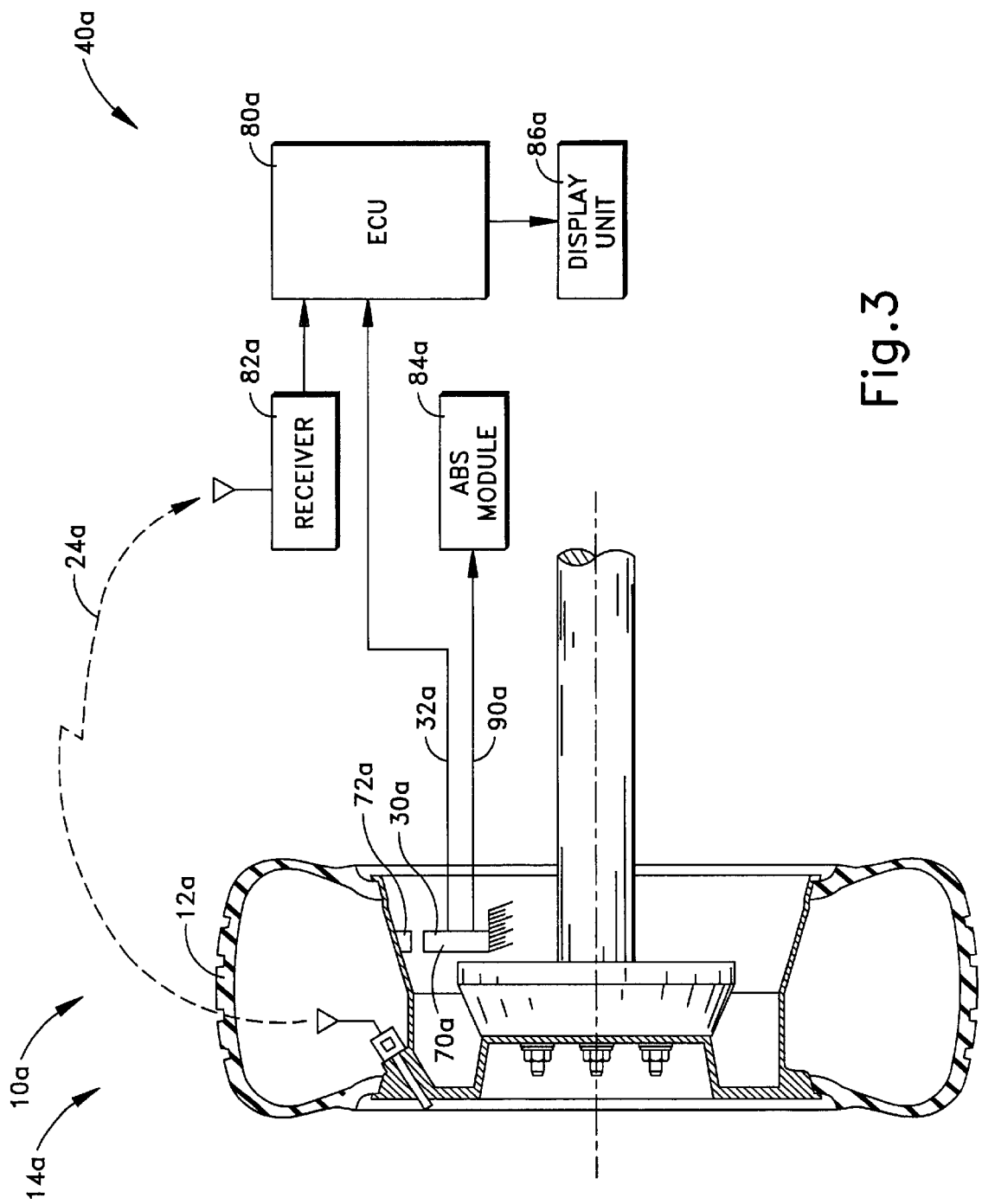
FIG. 3 is a schematic illustration of a portion of the system of FIG. 1, including portions of the vehicle structure, according to a second example embodiment of the present invention.

A second example embodiment of the present invention is illustrated in FIG. 3. The second embodiment is similar to the first embodiment illustrated in FIGS. 1 and 2. Accordingly, numerals similar to those of FIGS. 1 and 2 will be utilized in FIG. 3 to identify similar components, the suffix letter "a" being associated with the numerals of FIG. 3 to avoid confusion. The second embodiment is identical to the first embodiment (FIGS. 1 and 2), except that the rim identification sensor 30a is associated with the ECU 80a such that the rim identification signal 32a is sent directly to the ECU instead of the ABS module 84a.

As illustrated in FIG. 3, the rim identification sensor 30a composes a portion of the ABS speed sensor 70a. The rim identification sensor 30a is operatively connected to the ECU 80a. Thus, the rim identification signal 32a is provided directly to the ECU 80*a* from the rim identification sensor 30*a*. The ABS speed sensor 70*a* is operatively connected to the ABS module 84*a* to provide the speed signal 90*a* to the ABS module. Therefore, in the second example embodiment of FIG. 3, it is not necessary to operatively connect the ABS module 84*a* to the ECU 80*a*.

The receiver 82*a* provides the radio frequency signal 24*a*, which includes the sensed operating parameter and the identification code of the tire-based unit 20*a*, to the receiver 82*a*. The receiver 82*a* provides the sensed operating parameter of the tire 12*a* and the identification code of the tire-based unit 20*a* to the ECU 80*a*.

The rim identification sensor 30*a* conveys the tire position associated with the rim identification signal 32*a* to the ECU 80*a*. Thus, the ECU 80*a* is provided with the rim identification code associated with each tire position on the vehicle 14*a*. The ECU 80*a* correlates the rim identification code with the identification code of the tire-based unit 20*a* from which the radio frequency signal 24*a* is transmitted. The ECU 80*a* thereby associates the operating parameter of the tire 12*a* with the specific tire position at which the operating parameter is sensed. The system 10*a* is thus operable to sense the operating parameter of the tire 12*a* and the position of the tire on the vehicle 14*a*. The ECU 80*a* is operatively connected to the display unit 86*a* and thereby provides indication of the sensed operating parameters of the tires 12*a* and the position of the tires on the vehicle 14*a*.

The system 10*a* acquires the sensed operating parameters of the tires 12*a* and automatically associates the sensed operating parameters with the position of the tires from which the operating parameter is sensed. Thus, there is no need to calibrate or otherwise re-program the system 10*a* to learn new tire positions when events such as tire replacement or rotation take place.

From the above description of the invention, those skilled in the art will perceive improvements, changes and modifications. For example, in the example embodiments, the present invention has been illustrated as sensing a single operating parameter of the tires. It should be understood, however, that the present invention could be used to sense any number of operating parameters of the tires. Such improvements, changes and modifications within the skill of the art are intended to be covered by the appended claims.

Having described the invention, the following is claimed:

1. A system for monitoring an operating parameter of a vehicle tire, the tire being mountable on a rim that is mountable on a rotatable wheel hub of the vehicle, said system comprising:
   an identification connected to the rim, said identification conveying a rim identification code;
   means for sensing an operating parameter of the tire, said means for sensing providing a radio frequency signal indicative of a sensed operating parameter of the tire and an identification code of said means for sensing;
   means for detecting said identification and providing a rim identification signal, said rim identification signal being indicative of said rim identification code and the position on the vehicle where the tire is mounted;
   means for receiving said radio frequency signal;
   means for receiving said rim identification signal; and
   means for correlating said radio frequency signal with said rim identification signal to associate said radio frequency signal with the position on the vehicle where the tire is mounted.

2. The system as defined in claim 1, wherein said means for detecting and said means for receiving are operatively connected to said means for correlating, said means for correlating said rim identification code with said identification code of said means for sensing to associate said radio frequency signal with the position on the vehicle where the tire is mounted.

3. The system as defined in claim 2, wherein said means for correlating associates said sensed operating parameter of the tire with the position on the vehicle where the tire is mounted.

4. The system as defined in claim 1, wherein said identification comprises a plurality of magnetic elements having magnetic polarities arranged to provide a binary indication of said rim identification code.

5. The system as defined in claim 4, wherein said means for detecting said identification comprises means for sensing a magnetic field of said magnetic elements.

6. The system as defined in claim 5, wherein said means for sensing said magnetic fields comprises a Hall effect device.

7. The system as defined in claim 1, wherein said operating parameter comprises the inflation pressure of the tire, said means for sensing said operating parameter comprising a tire-based unit including a pressure sensor, said pressure sensor sensing a sensed inflation pressure of the tire, said tire-based unit further including a transmitter for providing said radio frequency signal indicative of the sensed inflation pressure.

8. The system as defined in claim 1, wherein said operating parameter comprises the temperature of the tire, said means for sensing said operating parameter comprising a tire-based unit including a temperature sensor, said temperature sensor sensing a sensed temperature of the tire, said tire-based unit further including a transmitter for providing said radio frequency signal indicative of the sensed temperature.

9. The system as defined in claim 1, wherein said means for detecting said identification comprises a portion of an ABS sensor adapted to be mounted adjacent the wheel hub, said ABS sensor being associated with a wheel position on the vehicle, said ABS sensor detecting a velocity of the wheel hub and providing a wheel speed signal indicative of the velocity.

10. The system as defined in claim 9, wherein said means for receiving said radio frequency signal comprises a receiver and said means for receiving said rim identification signal comprises an ABS controller, said means for correlating said radio frequency signal and said rim identification signal comprising an electronic controller operatively connected to said receiver and said ABS controller, said receiver providing said sensed operating parameter of the tire and the identification code of said means for sensing to said electronic controller, said ABS controller providing said rim identification code and the tire position at which said rim identification code is sensed to said electronic controller.

11. The system as defined in claim 10, wherein said electronic controller includes means for associating said rim identification code with the identification code of said means for sensing to associate said sensed operating parameter with the tire position at which said sensed operating parameter is sensed.

12. The system as defined in claim 10, wherein said ABS sensor is hard-wired to said ABS controller.

13. The system as defined in claim 12, wherein said electronic controller is operatively connected to display means, said controller controlling said display means to display said sensed operating parameter of the tire and the tire position of the tire.

14. The system as defined in claim 9, wherein said means for receiving said radio frequency signal comprises a receiver and said means for receiving said rim identification signal comprises an electronic controller, said receiver being operatively connected to said electronic controller and providing said sensed operating parameter of the tire and the identification code of said means for sensing to said electronic controller, said electronic controller determining said rim identification code and the tire position at which said rim identification code is sensed from said rim identification signal.

15. The system as defined in claim 14, wherein said electronic controller includes means for associating said rim identification code with the identification code of said means for sensing to associate said sensed operating parameter with the tire position at which said sensed operating parameter is sensed.

16. The system as defined in claim 14, wherein said ABS sensor is hard-wired to said electronic controller.

17. The system as defined in claim 16, wherein said electronic controller is operatively connected to display means, said controller controlling said display means to display said sensed operating parameter of the tire and the tire position of the tire.

18. A system for monitoring an operating parameter of a vehicle tire, the tire being mounted on a rim that is mounted on a rotatable wheel hub of the vehicle, said system comprising:

an identification connected to the rim, said identification conveying a rim identification code;

a tire-based unit for sensing an operating parameter of the tire and providing a radio frequency signal indicative of a sensed operating parameter of the tire and a unit identification code;

a rim identification sensor for sensing said identification and providing a rim identification signal, said rim identification signal being indicative of said rim identification code and the tire position of the rim on which said identification is connected;

an electronic controller;

a receiver for receiving said radio frequency signal, said receiver being operatively connected to said controller; and means for receiving said rim identification signal, said means for receiving being operatively connected to said controller, said controller correlating said rim identification code with said unit identification code to associate said radio frequency signal with the tire position of the rim.

19. The system as defined in claim 18, wherein said controller associates said sensed operating parameter of the tire position of the rim.

20. A method for monitoring an operating parameter of a vehicle tire, the tire being mountable on a rim that is mountable on a rotatable wheel hub of the vehicle, said method comprising the steps of:

connecting an identification to the rim, said identification conveying a rim identification code;

providing means for sensing an operating parameter of the tire, said means for sensing providing a radio frequency signal indicative of a sensed operating parameter of the tire and an identification code of said means for sensing;

providing means for detecting said identification and providing a rim identification signal, said rim identification signal being indicative of said rim identification code and the position of the tire on the vehicle;

providing means for receiving said radio frequency signal and said rim identification signal; and providing means for correlating said radio frequency signal with said rim identification signal to associate said radio frequency signal with the position on the vehicle where the tire is mounted.

\* \* \* \* \*